(12) United States Patent
Fujita et al.

(10) Patent No.: US 9,736,891 B2
(45) Date of Patent: Aug. 15, 2017

(54) INDUCTION HEATING CONTAINER

(71) Applicant: TOYO SEIKAN GROUP HOLDINGS, LTD., Tokyo (JP)

(72) Inventors: Hagino Fujita, Tokyo (JP); Mitsuyoshi Saitou, Tokyo (JP); Yoshihiro Saruwatari, Tokyo (JP); Osamu Koseki, Tokyo (JP)

(73) Assignee: TOKYO SEIKAN GROUP HOLDINGS, LTD., Tokyo (JP)

( * ) Notice: Subject to any disclaimer, the term of this patent is extended or adjusted under 35 U.S.C. 154(b) by 136 days.

(21) Appl. No.: 14/425,661

(22) PCT Filed: Sep. 18, 2013

(86) PCT No.: PCT/JP2013/005511
§ 371 (c)(1),
(2) Date: Mar. 4, 2015

(87) PCT Pub. No.: WO2014/050029
PCT Pub. Date: Apr. 3, 2014

(65) Prior Publication Data
US 2015/0215995 A1    Jul. 30, 2015

(30) Foreign Application Priority Data

Sep. 28, 2012 (JP) ................. 2012-216899
Mar. 11, 2013 (JP) ................. 2013-047816

(51) Int. Cl.
*H05B 6/12* (2006.01)
*H05B 6/08* (2006.01)
*A47J 36/02* (2006.01)

(52) U.S. Cl.
CPC ............ *H05B 6/1209* (2013.01); *A47J 36/02* (2013.01)

(58) Field of Classification Search
CPC ................................ A47J 36/02; H05B 6/1209
(Continued)

(56) References Cited

U.S. PATENT DOCUMENTS

| | | | | |
|---|---|---|---|---|
| 8,878,108 B2 * | 11/2014 | Kitaizumi | ............ | H05B 6/1245 126/220 |
| 2010/0059505 A1 * | 3/2010 | Fujita | ...................... | A47J 36/02 219/621 |
| 2010/0320195 A1 * | 12/2010 | Fujita | ...................... | H05B 6/12 219/647 |

FOREIGN PATENT DOCUMENTS

| | | |
|---|---|---|
| JP | 7-213420 A | 8/1995 |
| JP | 7-303569 A | 11/1995 |

(Continued)

OTHER PUBLICATIONS

International Search Report for PCT/JP2013/005511 dated Dec. 17, 2013.

(Continued)

*Primary Examiner* — Quang Van
(74) *Attorney, Agent, or Firm* — Sughrue Mion, PLLC

(57) ABSTRACT

An induction heating container (1) in which an induction heat generator (3) is attached to the inside of a container main body (2) made of a non-conductive material so as to enable cooking by heating by an electromagnetic cooker. The induction heat generator (3) includes: a laminated body involving a conductor layer (4) that generates heat by induction of eddy current by high-frequency magnetic field and a heat-seal layer (5) that imparts heat-sealing properties to the container main body, and an eddy current control part (6) obtained by cutting the conductor layer (4) along the circumferential direction.

11 Claims, 6 Drawing Sheets

(58) Field of Classification Search
USPC ....... 219/621, 620, 622, 624, 638, 647, 660, 219/667, 672; 126/220, 221
See application file for complete search history.

(56) References Cited

FOREIGN PATENT DOCUMENTS

| | | |
|---|---|---|
| JP | 9-117374 A | 5/1997 |
| JP | 9-276126 A | 10/1997 |
| JP | 2003-51375 A | 2/2003 |
| JP | 2005-52425 A | 3/2005 |
| JP | 2007-320651 A | 12/2007 |
| JP | 2007-330353 A | 12/2007 |
| JP | 2008-194139 A | 8/2008 |
| JP | 2010-63518 A | 3/2010 |
| JP | 2012-110636 A | 6/2012 |

OTHER PUBLICATIONS

International Preliminary Report on Patentability dated Apr. 9, 2015, issued by the International Bureau of WIPO in counterpart International Application No. PCT/JP2013005511.
Machine Translation of JP 2005-052425 A cited on Mar. 4, 2015.
Machine Translation of JP 2003-051375 A cited on Mar. 4, 2015.
Machine Translation of JP 2010-063518 A cited on Mar. 4, 2015.
Machine Translation of JP 2007-320651 A cited on Mar. 4, 2015.
Machine Translation of JP 2007-330353 A cited on Mar. 4, 2015.
Machine Translation of JP 07-213420 A cited on Mar. 4, 2015.
Machine Translation of JP 07-303569 A cited on Mar. 4, 2015.
Machine Translation of JP 2012-110636 A cited on Mar. 4, 2015.
Machine Translation of JP 09-117374 A cited on Mar. 4, 2015.
Machine Translation of JP 09-276126 A cited on Mar. 4, 2015.

\* cited by examiner

INDUCTION HEATING CONTAINER

CROSS REFERENCE TO RELATED APPLICATIONS

This application is a National Stage of International Application No. PCT/JP2013/005511 filed Sep. 18, 2013, claiming priority based on Japanese Patent Application Nos. 2012-216899 filed Sep. 28, 2012 and 2013-047816 filed Mar. 11, 2013, the contents of all of which are incorporated herein by reference in their entirety.

TECHNICAL FIELD

The present invention relates to an induction heating container provided with an induction heat generator in which heat is generated by joule heat caused by eddy current induced by a high-frequency magnetic field that occurs by an induction heating coil of an electromagnetic cooker or the like.

BACKGROUND ART

In recent years, a heating cooking device generally called as an electromagnetic cooker in which an object to be heated is heated by joule heat caused by eddy current induced by a high-frequency magnetic field that occurs by an induction heating coil provided inside has come to be widely used in common households. As cookware used for heating an object to be heated by inducting heating by means of an electromagnetic cooker, dedicated cookware made of a metal such as iron and enameled iron has conventionally been used.

Under such circumstances, in order to provide a container capable of conducting induction heating by means an electromagnetic cooker at a low cost, the applicant proposed, in Patent Documents 1, 2 or the like, a container for an electromagnetic cooker in which a heat generator made of a conductive material that generates heat by induction heating is attached to the container main body made of a non-conductive material.

RELATED ART DOCUMENTS

Patent Documents

Patent Document 1: JP-A-2008-194139
Patent Document 2: JP-A-2010-063518

SUMMARY OF THE INVENTION

Problems to be Solved by the Invention

As for these induction heating containers proposed by the applicant, by combining a container main body molded by using a general-purpose resin material and an induction heat generator formed by using an inexpensive conductive material such as aluminum foil, in order to enable the containers to be disposed and to be provided at an inexpensive cost, the following problems are intended to be solved.

That is, when a container main body is molded by using a general-purpose resin material, if an induction heat generator is heated excessively, the container main body may be damaged such as deformation, burning or the like. To solve this problem, in Patent Document 1, an induction heat generator is separated in the radial direction, the edge parts of the separated parts are abutted or superimposed to form a fuse function part. In the case of overheating, i.e. in the case where an inducting heat generator is heated excessively (for example, in the case of empty boiling), the fuse function part is caused to be broken selectively, whereby the container is prevented from being damaged by avoiding overheating.

Such containers may encounter the following problem. Due to uneven heating or the like, a liquid object to be heated (e.g. water) in the container is suddenly heated locally, thereby causing bumping. As a result, the object to be heated is scattered to cause a user to get burned or to cause the surrounding area of an electromagnetic cooker to be contaminated. In contrast, in Patent Document 2, an induction heat generator is partially fixed to the inner bottom surface of a container main body, whereby linear adhesion parts extending in the circumferential direction of the heat generator are intermittently formed such that they are spaced from each other in the radial direction, whereby bumping that occurs at the time of heating a liquid object to be heated is suppressed.

However, as a result of further intensive studies made by the inventors of the present invention, they have found that, in these conventional technologies, there are still problems to be solved for the prevention of bumping, in particular.

The present invention has been made in view of the above-mentioned circumstances, and is aimed at providing an induction heating container that can be used as an induction heating container in which an induction heat generator is attached to a container main body made of a non-conductive material and a liquid object to be heated accommodated therein is heated by an electromagnetic cocker or the like, and in such use, bumping at the time of heating a liquid object to be heated can be effectively prevented.

Means for Solving the Problems

The induction heating container of the present invention has a configuration in which an induction heat generator is attached to the inside of a container main body that is made of a non-conductive material so as to enable cooking by heating by an electromagnetic cooker, wherein
the induction heat generator comprises:
a laminated body involving a conductor layer that generates heat by induction of eddy current by high-frequency magnetic field and a heat-seal layer that exhibits heat-sealing properties to the container main body, and
an eddy current control part that is obtained by cutting the conductor layer along the circumferential direction.

Advantageous Effects of the Invention

The induction heating container of the present invention can be safely used as an induction heating container with which bumping of a liquid object to be heated accommodated therein is effectively suppressed, whereby burning of a user or contamination of the surrounding area of an electromagnetic cooker can be prevented.

MODE FOR CARRYING OUT THE INVENTION

Hereinbelow, preferred embodiments of the present invention will be explained with reference to the drawings:

First Embodiment

First, the first embodiment of the induction heating container of the present invention will be explained.

Figure 1:
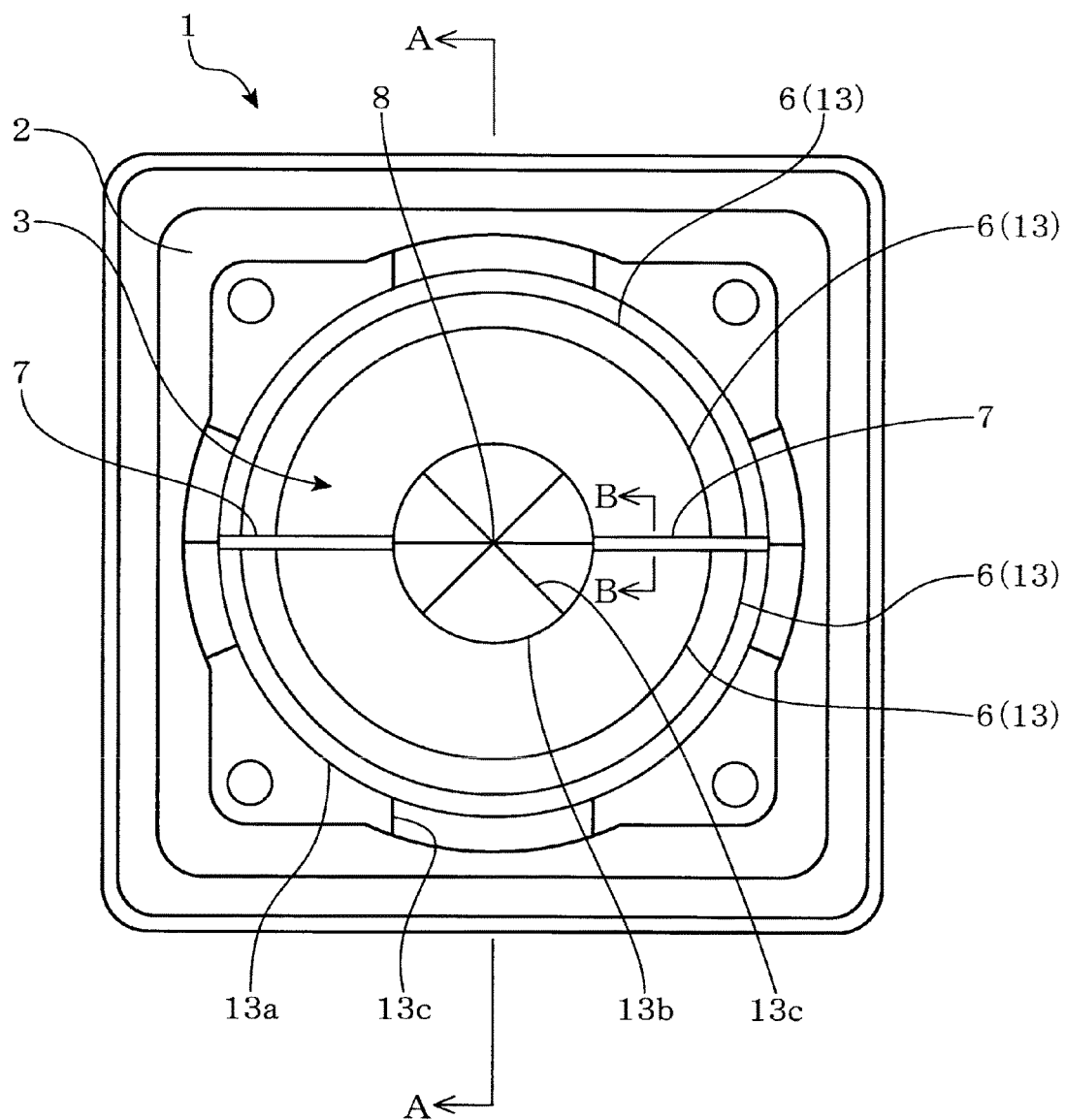
FIG. 1 is a plan view showing an outline of a first embodiment of the inducting heating container of the present invention.
Figure 2:
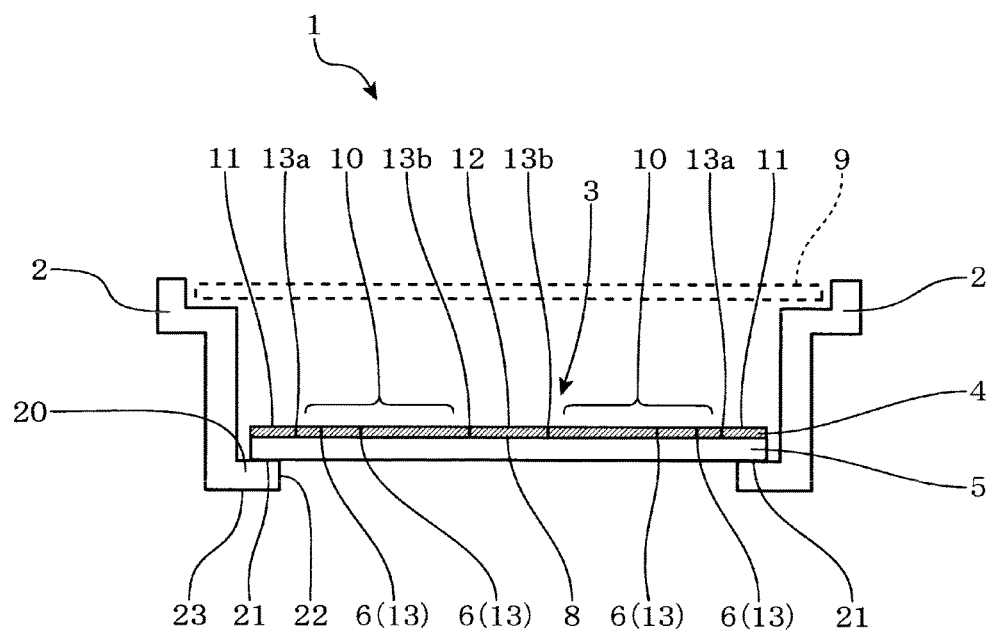
FIG. 2 is a schematic end elevation taken along the line A-A in FIG. 1.

FIG. 1 is a plan view showing the outline of the induction heating container according to this embodiment, and FIG. 2 is a schematic end elevation taken along the line A-A in FIG. 1.

The induction heating container 1 shown in FIGS. 1 and 2 is provided with a container main body 2 formed of a non-conductive material and an induction heat generator 3 attached to the inside of the container main body.

The induction heat generator 3 is formed of a laminated body that includes a conductor layer 4 that generates heat when eddy current is induced by high-frequency magnetic field and a heat-seal layer 5 that has heat-sealing properties for the container main body 2.

The induction heating container 1 is generally used on a commercially available electromagnetic cocker. Therefore, it is preferred that the sizes of the container main body 2 and the induction heat generator 3 be set according to the size of the heating coil provided in the electromagnetic cocker used. For example, a general heating coil provided in a commercially available household electromagnetic cocker has an inner diameter of about 5 cm and an outer diameter of about 20 cm. In the case of an electromagnetic cocker for business use, a larger heating coil may be used. The size thereof is appropriately set according to the electromagnetic cocker that is supposed to be used.

The container main body 2 is formed of a non-conductive material. A synthetic resin material such as a polystyrene-based resin such as polystyrene, a polyester-based resin such as polyethylene terephthalate, a polyolefin-based resin such as polypropylene, a polyamide-based resin or the like can preferably be used. The container main body 2 may be of a single layer structure or a multilayer structure obtained by combining these resins with one another or by combining these resins with other functional resins. Although paper, glass or the like can also be used as the non-conductive material, taking into consideration heat sealing with the heat-seal layer 5 in the induction heat generator 3, it is preferred that the inner surface thereof be coated with the above-mentioned synthetic resin.

The shape of the container main body 2 is not limited to that shown in the figure. Various shapes can be selected such that the shape in the planer view is square, rectangular oblong, circle, elliptical or the like. In the shown example, in the planer view, the shape of the container main body 2 is almost square, and a step is provided in the vicinity of an opening at the upper end such that a tray 9 on which foodstuff is mounted can be supported or fitted. Although not particularly shown, a configuration is possible in which, on the tray 9 that is supported by or fitted to the container main body 2, another induction heating container 1 is stacked.

The induction heat generator 3 has an almost circular flat plate form, and is attached to a bottom surface 20 of the container main body 2 in an almost circular flat plate form. As for the shape of the induction heat generator 3 to be attached to the container main body 2, a circle is most effective in respect of properties of eddy current induced. However, according to the shape of the container, it may be square or elliptical. Not particularly shown, a rising part may be provided along the side wall of the container main body 2.

As for the conductive material forming the conductor layer 4 of the induction heat generator 3, various conductive materials that generate heat by induction heating caused by high-frequency magnetic field such as a metal including aluminum, nickel, gold, silver, copper, platinum, iron, cobalt, tin and zinc, or alloys thereof can be used. More specifically, when aluminum is used as a conductive material, for example, the conductor layer 4 can be formed by using aluminum foil having a thickness of about 0.10 to 100 μm, more preferably 1 to 40 μm.

If metal foil such as aluminum foil is used, when the induction heat generator 3 is attached to the container main body 2, it becomes easy to adapt the induction heat generator 3 to the shape of the container main body 2 by subjecting the induction heat generator 3 to three-dimensional processing, e.g. folding along a bottom surface 21 or the side wall of the container main body 2, or the like.

The heat-seal layer 5 of the induction heat generator 3 is not particularly restricted as long as it has heat-sealing properties for the container main body 2. The heat-seal layer 5 can be appropriately selected according to a non-conductive material forming the container main body 2. A synthetic resin material similar to the synthetic resin material used for the container main body 2 can be used. As one example, it is preferable to use polypropylene that is easy to be processed by molding, has good heat-sealing properties and an adequate heat resistance.

The conductor layer 4 and the heat-seal layer 5 can be laminated directly or through an adequate adhesive by a known laminating technology. By configuring the induction heat generator 3 as a laminated body, since conventionally known technologies for producing a multilayer film or a multilayer sheet can be applied, the production of the induction heat generator 3 and the induction heating container 1 that is provided with the induction heat generator 3 is facilitated.

In such induction heat generator 3, a fuse function part 7 that is broken selectively under specific circumstances (such as empty boiling) is provided. Two fuse function parts 7 are radially provided on an extension of the center line that passes a shape center 8 of the induction heat generator 3 with a prescribed distance being provided from the shape center 8.

Figure 3:
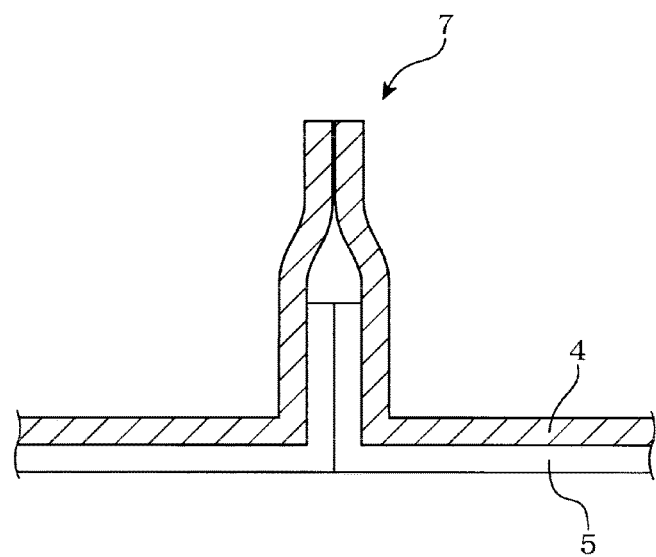
FIG. 3 is a schematic end elevation taken along the line B-B in FIG. 1.

As for the fuse function part 7, a technology disclosed in Patent Document 1 or JP-A-2010-044929 can be used, for example. Specifically, the induction heat generator 3 is separated in the radial direction, and edges of the thus separated generator are abutted to each other or superimposed one on another to allow the conductor layers 4 are brought into contact and re-bonded. FIG. 3, which is a schematic end elevation view taken along line B-B in FIG. 1, shows one example of such fuse function part 7. In this example, the edge part sides of the separated conductor layer 4 rises, and the edges thereof are aligned, superimposed one on another, and bonded. In order to ensure bonding of one conductor layer 4 with another conductor layer 4, the heat-seal layer 5 in the corresponding part is peeled off. In the fuse function part 7, in addition to the configuration mentioned above, known technologies can be used; for example, a technology disclosed in JP-H07-296963 in which a narrow part in which the width in the radial direction becomes locally shortest is provided from the center to the outer periphery of the heat generator, whereby eddy current is concentrated in the narrow part to allow the temperature of the narrow part to be higher than that of other parts, a technology disclosed in JP-A-2007-330391 in which the radial direction of a heat generator is subjected to mountain folding processing in the radial direction to form a projection, and the projection is exposed from the liquid surface before other parts are exposed.

In the induction heat generator 3, an eddy current control part 6 that is formed by cutting the conductor layer 4 along the circumferential direction is provided. A plurality of eddy current control parts 6 are provided such that they avoid the fuse function part 7 and that they are spaced from each other in the radial direction. Specifically, in a configuration in which the double concentric circle around the shape center 8 is intermitted only on a part that intersects the fuse function part 7, the eddy current control parts 6 are provided by four cutting lines 13 in total in a region slightly nearer to the outer periphery of the induction heat generator 3 (a main heating area 10, mentioned later).

The edges of the cutting lines 13 that form the eddy current control part 6 serve as a starting point where bubbles are generated when an object to be heated such as water is boiled. Accordingly, at the time of boiling, a large amount of small bubbles is continuously generated as in the case where a boiling bubble stone is put, whereby an effect is exhibited that abrupt generation of large bubbles is prevented. At the same time, the eddy current control part 6 controls the eddy current induced in the conductor layer 4, and enables uniform heating, whereby occurrence of bumping is suppressed.

Eddy current is strongly induced in accordance with the shape of a heating coil provided in an electromagnetic cooker on which the induction heating container 1 is mounted. The current density distribution thereof is not uniform in the radial direction, and has a current density peak at a position slightly closer to the outer periphery than the center of the radial direction, and as a result, a corresponding position of the conductor layer 4 is strongly heated. The cutting line 13 that forms the eddy current control part 6 is, as shown in the schematic end elevation in FIG. 4(a), obtained by cutting the conductor layer 4 of the laminated bodies forming the induction heat generator 3. No current is flown in a direction crossing the cutting line 13. By forming the cutting line 13 that extends in the circumferential direction in order to prevent eddy current from being concentrated in a part closer to the outside, eddy current can be aligned to attain uniform heating.

It is desired that a plurality of the eddy current control part 6 which is formed by the cutting line 13 be provided. For the reasons mentioned above, it is preferred that the eddy current control parts 6 be provided densely in a part closer to the outer periphery as compared with a case where they are arranged uniformly in the radial direction. However, no eddy current control part 6 is provided in the fuse function part 7 in order not to impede its function of being selectively broken down at the time of overheating.

The shape of the cutting line 13 that constitutes the eddy current control part 6 is not limited to a circle or an arc around the shape center 8 of the induction heat generator 3. It can be appropriately altered taking into account factors that affect the state of eddy current induced, such as the shape of a heating coil of an electromagnetic cooker that is supposed to be used or the entire shape of the induction heat generator 3.

In the shown configuration, the induction heat generator 3 is separated into the main heating region 10 on the center side and the peripheral region 11 on the outer periphery side by a first radial direction cutting line 13a that cuts the conductor layer 4 circularly (see FIG. 2). As mentioned above, since eddy current does not flow in the direction crossing the cutting line 13, eddy current is formed independently for each region separated. In the main heating region 10, strong eddy current is induced around the shape center 8 of the induction heat generator 3 (mounted on the center of the heating coil), therefore the main heating area 10 is heated most efficiently. All of the plural eddy current control parts 6 and the fuse function part 7 are provided in the main heating area 10.

If the first radial direction cutting line 13a is not provided, the entire induction heat generator 3 can be regarded as the main heating area The peripheral area 11 is separated into plural small areas by a circumferential cutting line 13c that extends in the radial direction. By separating in the circumferential direction, strong eddy current around the shape center 8 is not induced. Accordingly, the temperature of the conductor layer 4 in the peripheral area 11 is not raised too much. Therefore, by attaching the induction heat generator 3 to the container main body 2 by heat sealing with the container main body 4 by the heat-seal layer 5 in the peripheral area 11, even when the temperature of the main heating area 10 of the induction heat generator 3 rises, heat transmission to the conductor main body 2 can be suppressed, whereby deformation or burning of the container main body 2 can be prevented.

Similarly, in the inner peripheral side of the main heating area 10 including the shape center 8, a central adjustment area 12 is formed by a second radial direction cutting line 13b that cuts the conductor layer 4 circularly (see FIG. 2). The central adjustment area 12 is separated into plural areas in the circumferential direction by a circumferential direction cutting line 13c. Due to such a configuration, as in the case of the peripheral area 11, strong eddy current is not formed in the central adjustment area 12.

Eddy current induced in the region including the shape center 8 is not so strong. However, the current density distribution thereof is slightly unstable and may disturb eddy current that flows in the outer side, and hence, it is preferable to separate the conductor layer 4 in this area from the main heating area.

Figure 4:
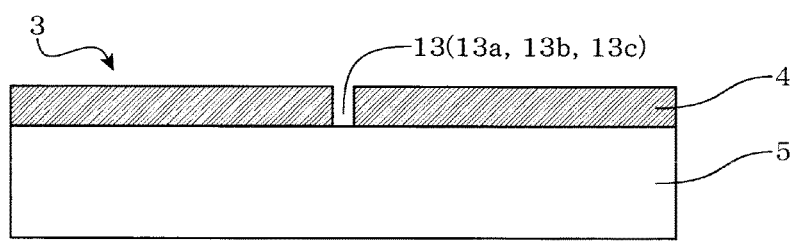
FIG. 4(a), FIG. 4(b) and FIG. 4(c) are schematics and elevations showing the configuration of the cutting line in the induction heat generator of the induction heating container of the present invention.
Figure 4:
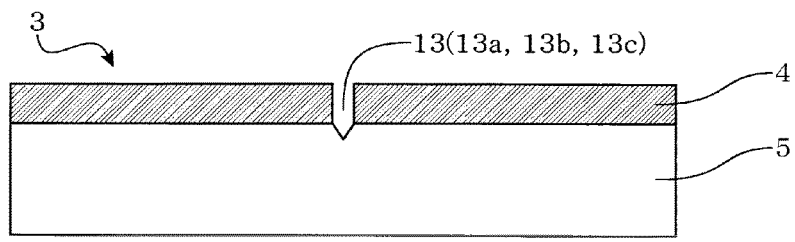
Figure 4:
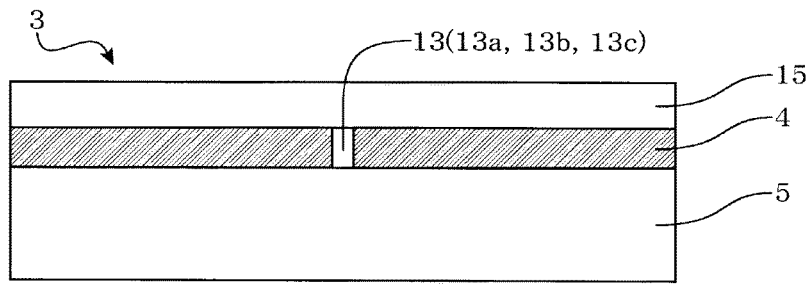

As shown in FIG. 4(a), as in the case of the cutting line 13 that forms the eddy current control part 6, all of the first radial direction cutting line 13a, the second radial direction cutting line 13b and the circumferential direction cutting line 13c are obtained by cutting the conductor layer 4 of the laminated body that forms the induction heat generator 3. By allowing the heat-seal layer 5 to be in the connected state, without cutting, the induction heat generator 3 can be handled as an integrated body, leading to significant easiness at the time of production.

When forming these cutting lines, half-cutting is conducted by a knife from the side of the conductor layer 4, or selective cutting of the conductor layer 4 is conducted by means of a YAG laser, a semiconductor layer or the like. Within a range that no adverse effects are imposed on handling of the induction heat generator 3 as an integrated body, a part of the heat seal layer 5 may be cut (see FIG. 4(b)). Further, on the surface of the conductor layer 4, a protective layer 15 that is formed of the same resin material as that of the heat-seal layer 5 may be provided (see FIG. 4(c)).

In the shown configuration, the induction heat generator 3 is attached in such a manner that the heat-seal layer 5 in the peripheral region 11 is heat-sealed to a heat seal site 21 of the bottom surface 20 of the container main body 2. On the inner peripheral side of the heat-seal site 21 on the bottom surface 20 of the container main body 2, a through hole 22 is provided, the induction heat generator 3 is exposed, and the through hole 22 is sealed by the induction heat generator 3.

The bottom surface 20 of the container main body 2 may be deformed by bending during cooking with heat, and may be mounted on an electromagnetic cooker in an unstable manner. In this embodiment, by removing the bottom surface from a position right below the main heating area 10 of the induction heat generator 3, of which the temperature becomes highest, the container is prevented from being deformed by bending. In addition, since a grounding part 23 surrounding the through hole 22 has a higher rigidity than that of the induction heat generator 3, even if the induction heat generator 3 that is exposed from the through hole 22 is bent, it can keep a stable posture.

The container main body 2 is not limited to the shown example. It may be of a common configuration in which the bottom surface 20 is closed, that is a general form. Attachment of the induction heat generator 3 in that case, the technology disclosed in Patent Document 2 can also be used. Further, similar effects can be obtained by providing a through hole in the middle of the induction heat generator 3 instead of the central adjusting region 12. In addition, a convection hole that accelerates the convection of an object to be heated may appropriately be formed by penetration.

The induction heating container 1 having such a configuration is able to accommodate a liquid object to be heated (water, soup, or the like) and is able to heat the object to be heated by mounting on an electromagnetic cooker. Under specific circumstances where heating starts without accommodating an object to be heated or the container is left until a liquid object to be heated is evaporated, or the like, the fuse function part 7 is broken, and the break-down of the fuse part 7 is detected by a safety device of the electromagnetic cocker, then the heating is terminated. As a result, damage on the container can be prevented. When the electromagnetic induction heating container 1 is used for steam cocking as a disposable container, or the like, the fuse function part 7 can be used like a cooking timer.

Further, according to the induction heating container 1 of the present invention, the edges of the cutting lines 13 that constitute the eddy current control part 6 (that is, the cutting surface (edge exposed part) in which the conductor layer 4 is cut in the thickness direction and exposed) (see FIGS. 4(a) and 4(b)) serve as a starting point at which an object to be heated such as water boils to allow bubbles to be generated, and a large amount of small bubbles is continuously formed, thus preventing sudden formation of large bubbles. In addition, due to the presence of the eddy current control part 6, disturbance or deviation of eddy current is prevented, whereby uniform heating becomes possible, leading to effective suppression of bumping.

Accordingly, a circumstance where an object to be heated that has been scattered causes a user to get burned and causes the surrounding area of the electromagnetic cooker to be contaminated can be avoided. Further, since the eddy current control part 6 is provided such that it avoids the fuse function part 7, it can be used safely without hindering operation of the fuse function part 7.

Second Embodiment

Next, an explanation will be made on the second embodiment of the induction heating container of the present invention.

Figure 5:
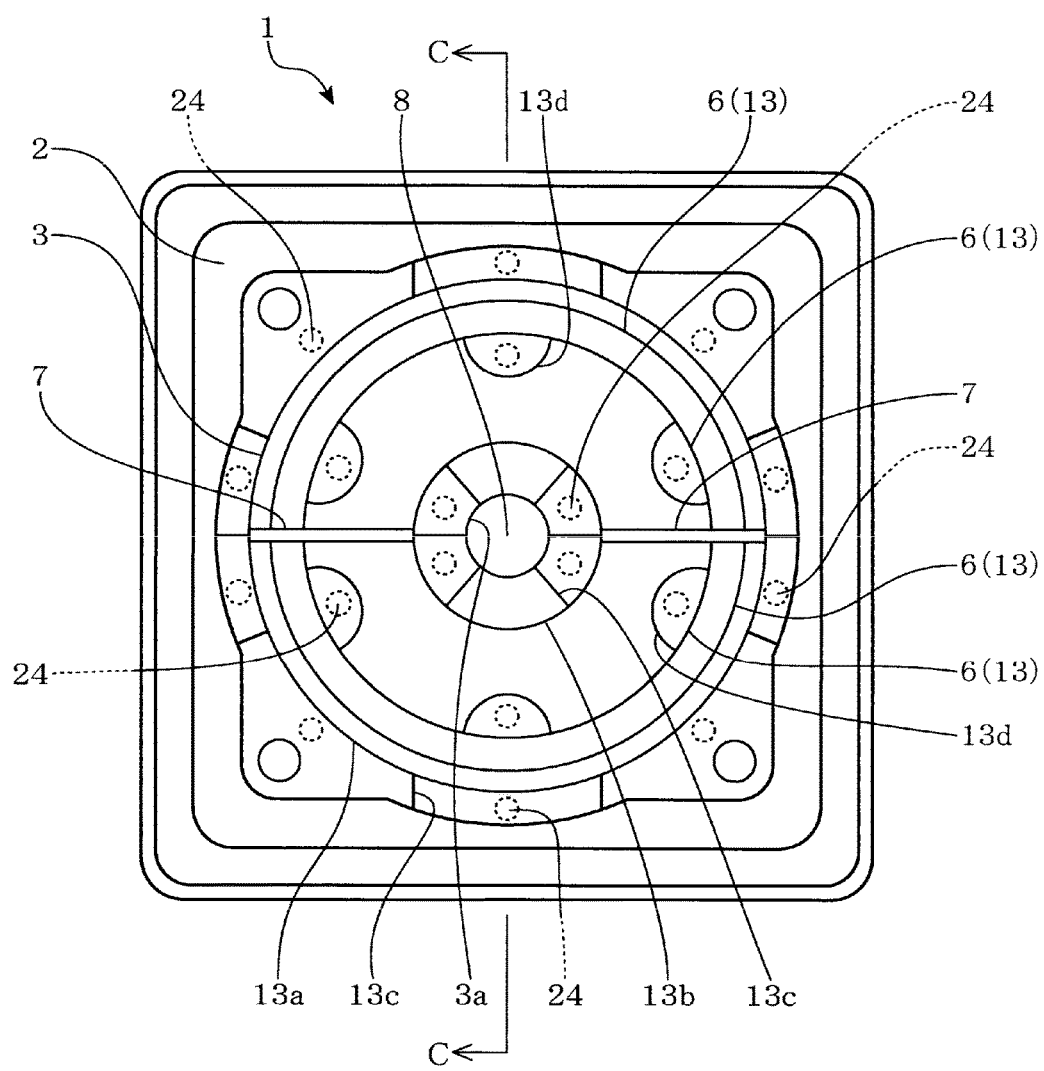
FIG. 5 is a plan view showing the outline of the second embodiment of the induction heating container of the present invention.
Figure 6:
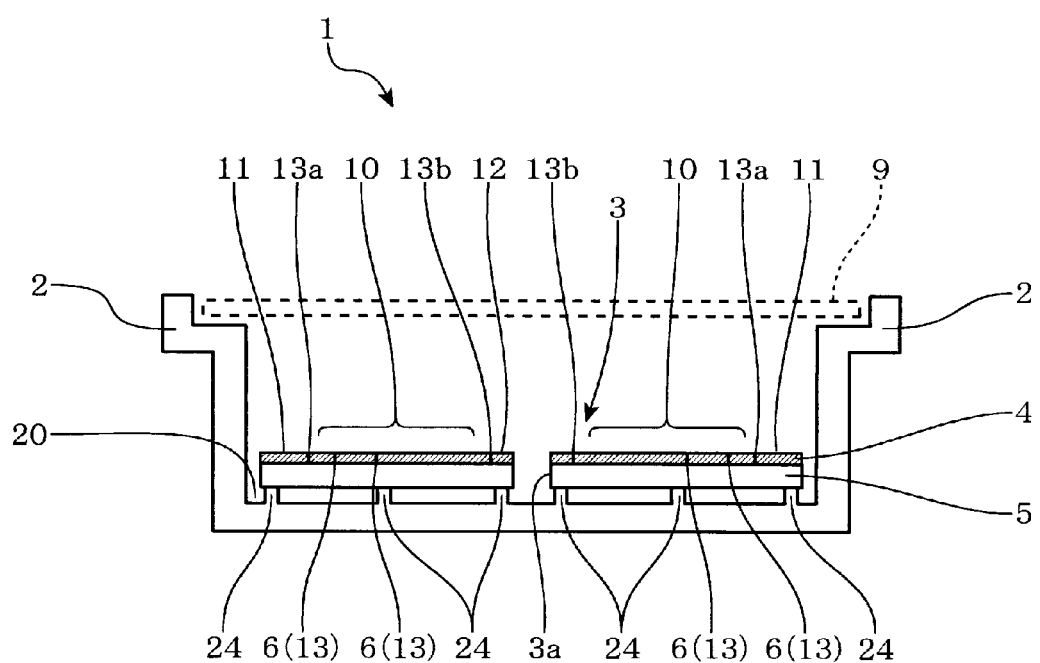
FIG. 6 is a schematic end elevation taken along the line C-C in FIG. 4.

FIG. 5 is a plan view showing the outline of the induction heating container of this embodiment and FIG. 6 is an end elevation taken along line C-C in FIG. 5.

The induction heating container 1 shown in FIG. 5 and FIG. 6 is provided with the container main body 2 formed of a non-conductive material and the induction heat generator 3 that is attached to the closed bottom surface 20 of this container main body 2.

The bottom surface 20 of the container main body 2 is almost square. The container main body 2 is configured such that it can accommodate a liquid object to be heated such as water by allowing a side wall part to rise such that it surrounds this bottom surface 20. The shape of the bottom surface 20 is not limited to that shown in the figures. For example, the shape of the bottom surface 20 may be rectangular or circular. In addition, the shape may be a polygon such as a triangle, a pentagon and a hexagon. As for the overall shape of the container main body 2, it may have various shapes taking easiness in handling or the like into account. As in the first embodiment mentioned above, the dimensions of the container main body 2 and the induction heat generator 3 are set adequately.

This embodiment differs from the above-mentioned first embodiment in that the container main body 2 of which the bottom surface 20 is closed is used, and the induction heat generator 3 is attached to the bottom surface 20 of the container main body 2 and the features changed in accordance therewith. Other features are the same as those in the above-mentioned first embodiment, and hence a duplicated explanation is omitted.

In attaching the induction heat generator 3 to the bottom surface 20 of the container main body 2, it is preferred that the induction heat generator 3 be attached such that it is spaced from the bottom surface 20 of the container main body 2. By attaching the induction heat generator 3 such that it is spaced from the bottom surface 20 of the container main body 2, a liquid object to be heated such as water accommodated within the container main body 2 spreads to a gap between the induction heat generator 3 and the bottom surface 20 of the container main body 2. As a result, the efficiency of heating an object to be heated can be enhanced, and at the same time, damage of the container main body 2 by heat from the induction heat generator 3 can be effectively avoided. At this time, in order to prevent the container main body 2 from being damaged, a through hole 3a that is cut in an arbitrary shape such as circular or elliptical or a slit-like cut is provided in the middle or its vicinity of the induction heat generator 3 so that convection is accelerated to prevent an object to be heated from stagnating in the backside of the induction heat generator 3.

In order to attach the induction heat generator 3 such that it is spaced from the bottom surface 20 of the container main body 2, the induction heat generator 3 may be heat-sealed to a supporting part 24 that projects from the bottom surface 20 of the container main body 2, for example.

As mentioned above, if the conductor layer 4 is separated into small regions, strong eddy current is not induced in these regions, and hence the temperature of these regions does not rise greatly. Therefore, in the first embodiment mentioned above, the conductor layer 4 is separated into the main heating region 10 and the peripheral region 11 (on the outer peripheral side) by the first radial direction cutting line 13a, the peripheral area 11 is separated into plural small areas by the circumferential direction cutting line 13c, and these regions are heat-sealed to the container main body 2 in the heat-seal layer 5 in the peripheral area 11. For the same reasons, it is preferred that heat sealing to the supporting part 24 be conducted in the heat seal-layer 5 in the peripheral area 11. In this embodiment, based on the similar concept, the induction heat generator 3 is heat-sealed to the supporting part 24 in the heat-seal layer 5 of the central adjustment region 12. Further, it is preferred that, also in the main heating region 10 of the induction heat generator 3, small areas separated from the main heating area 10 be formed by surrounding a specific range of the conductor layer 4 by a cutting line 13d and that heat sealing to the supporting part 24 be conducted by the heat-seal layer 5 in these small areas. As a result, heat transmission from the induction heat generator 3 to the container main body 2 is suppressed, whereby deformation or burning of the container main body 2 can be prevented.

Figure 7:
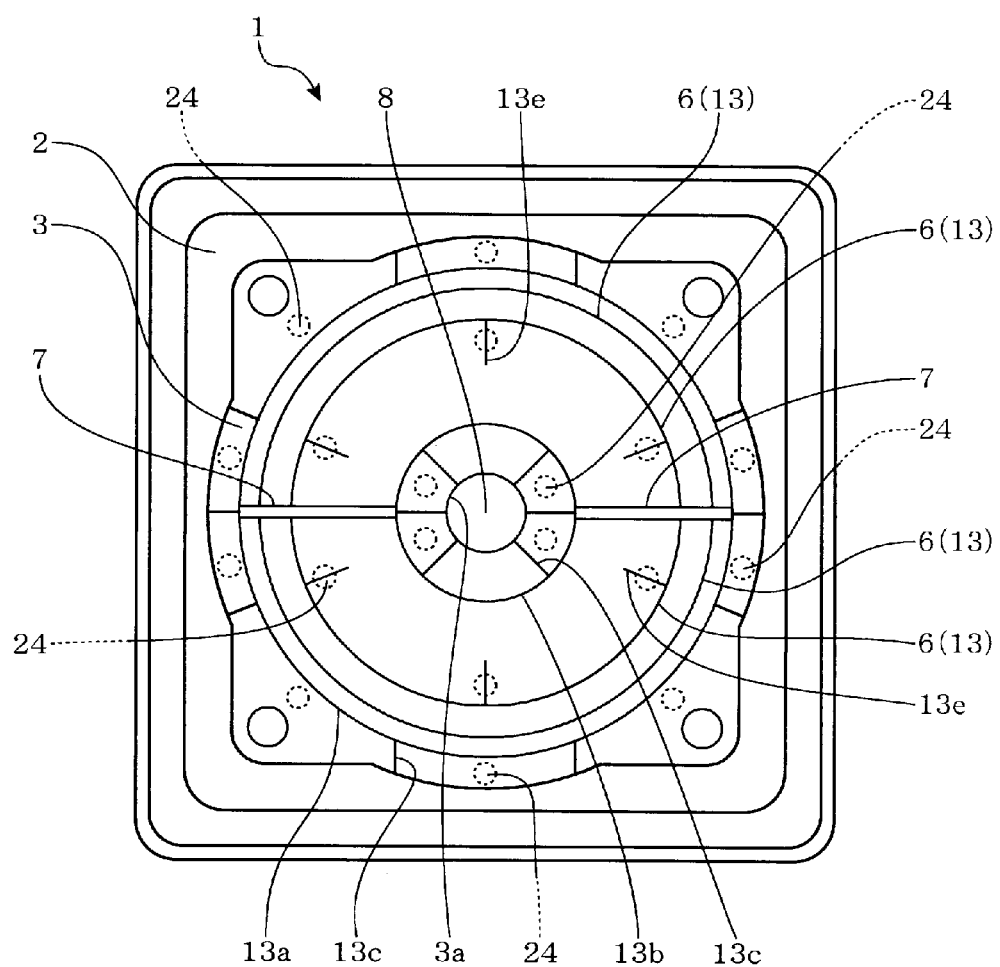
FIG. 7 is a plan view showing the outline of a modification example of a second embodiment of the induction heating container of the present invention.

When the induction heat generator 3 is heat-sealed to the supporting part 24 by the heat-seal layer 5 in the main heating area 10 thereof, if cutting lines 13e that are in the form of line segments extending in the radial direction are formed as shown in FIG. 7, it can be assumed that eddy current flows while avoiding such cutting line 13e. Therefore, as shown in FIG. 7, it can be configured such that the induction heat generator 3 be heat-sealed to the support part 24 in the heat-seal layer 5 at a part that overlaps the cutting line 13e.

By attaching the induction heat generator 3 to the container main body 2 also in the central adjustment area 12 or the main heating area 10, floating or waving of the induction heat generator 3 due to convection or flow of an object to be heated or repulsion with the heating coil can be suppressed, whereby more stable heating becomes possible.

When cutting lines are formed in the main heating area 10, the shape or the dimension thereof is taken into consideration so that eddy current that is induced in the main heating area is not greatly disturbed.

The present invention is explained hereinabove with reference to preferable embodiments. The present invention is not limited to the above-mentioned embodiments, and it is needless to say various modifications are possible within the scope of the present invention.

For example, in the above-mentioned embodiments, the cutting lines 13, 13a, 13b, 13c, 13d and 13e are indicated as those obtained by separating completely the conductor layer 4 in the thickness direction. However, these cutting lines may be in the state where the conductor layer 4 is connected thereto with a part in the thickness direction being remained. As long as an edge exposed part obtained by cutting the conductor layer 4 in the thickness direction is formed, and this edge exposed part serves as a starting point where bubbles are generated when an object to be heated such as water boils, whereby occurrence of bumping is suppressed by preventing abrupt generation of large bubbles, the conductor layer 4 is not necessarily broken completely in the edge exposed part.

INDUSTRIAL APPLICABILITY

The induction heating container according to the present invention can be used as a container that is able to heat an object to be heated by a commercially available an electromagnetic cooker.

DESCRIPTION OF REFERENTIAL NUMERALS

1. Induction heating container
2. Container main body
3. Induction heat generator
4. Conductor layer
5. Heat-seal layer
6. Eddy current control part
7. Fuse function part
13. Cutting line

The invention claimed is:

1. An induction heating container in which an induction heat generator is attached to the inside of a container main body that is made of a non-conductive material so as to enable cooking by heating by an electromagnetic cooker, wherein
the induction heat generator comprises:
a laminated body involving a conductor layer that generates heat by induction of eddy current by high-frequency magnetic field and a heat-seal layer that exhibits heat-sealing properties to the container main body, and
an eddy current control part that is obtained by cutting the conductor layer along the circumferential direction,
a fuse function part that is selectively broken under specific circumstances, and
the eddy current control part is provided such that it avoids the fuse function part.

2. The induction heating container according to claim 1, wherein the eddy current control part is formed of an edge exposed part obtained by cutting the conductor layer in the thickness direction.

3. The induction heating container according to claim 1, wherein
a plurality of the eddy current control parts are provided such that they are spaced from each other in the radial direction.

4. The induction heating container according to claim 1, wherein, in the induction heat generator, the conductor layer is cut so as to form a main heating area that includes the eddy current control part and a peripheral area that is on the outer peripheral side of the main heating area, and
a heat-seal layer of the peripheral area is heat-sealed to the container main body.

5. The induction heating container according to claim 4, wherein, in the main heating area, the conductor layer is cut to form small areas separated from the main heating area, and the heat-seal layer of the small areas is heat-sealed to the container main body.

6. The induction heating container according to claim 4, wherein, in the main heating area, cutting lines in the form of line segments extending in the radial direction are formed in the conductor layer, and a part of the heat-seal layer that overlaps the cutting line is heat-sealed to the container main body.

7. The induction heating container according to claim 4, wherein the conductor layer in the peripheral area is further separated in the circumferential direction.

8. The induction heating container according to claim 4, wherein, in the induction heat generator, the conductor layer is cut such that a central adjustment area is formed on the inner peripheral side of the main heating area.

9. The induction heating container according to claim 8, wherein the conductor layer in the central adjustment area is further separated in the circumferential direction.

10. The induction heating container according to claim 4, wherein the eddy current control part is arranged closer to the outer periphery of the main heating area.

11. The induction heating container according to claim 4, wherein, the container main body has a through hole in a bottom surface on the inner peripheral side of a part where the peripheral area of the induction heat generator is heat-sealed, and the through hole is sealed by the induction heat generator.

\* \* \* \* \*